(12) United States Patent
Park et al.

(10) Patent No.: US 8,904,378 B2
(45) Date of Patent: Dec. 2, 2014

(54) METHOD AND APPARATUS FOR PERFORMING SERVICE RELATED TO A PREDETERMINED DEVICE TO ANOTHER DEVICE BASED ON WIDGET MIGRATION

(75) Inventors: Kyung-mo Park, Seoul (KR); Young-sun Ryu, Seongnam-si (KE); Jae-yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 13/244,306

(22) Filed: Sep. 24, 2011

(65) Prior Publication Data

US 2012/0089977 A1 Apr. 12, 2012

Related U.S. Application Data

(60) Provisional application No. 61/391,168, filed on Oct. 8, 2010.

(30) Foreign Application Priority Data

Apr. 20, 2011 (KR) .................. 10-2011-0036848

(51) Int. Cl.
   *G06F 9/445* (2006.01)
(52) U.S. Cl.
   CPC ..................... *G06F 8/61* (2013.01)
   USPC ......... 717/177; 717/178; 715/740; 348/14.05

(58) Field of Classification Search
   USPC ................. 717/177, 178, 172, 173, 175, 176; 173/174
   See application file for complete search history.

(56) References Cited

U.S. PATENT DOCUMENTS

| | | | | |
|---|---|---|---|---|
| 5,805,897 | A * | 9/1998 | Glowny | 717/178 |
| 6,421,781 | B1 * | 7/2002 | Fox et al. | 726/4 |
| 6,675,382 | B1 * | 1/2004 | Foster | 717/177 |
| 6,918,113 | B2 * | 7/2005 | Patel et al. | 717/178 |
| 7,634,772 | B2 * | 12/2009 | Parthasarathy et al. | 717/178 |
| 7,685,341 | B2 * | 3/2010 | Steinberg et al. | 710/72 |
| 8,271,970 | B2 * | 9/2012 | Bayer | 717/172 |
| 2004/0027373 | A1 * | 2/2004 | Jacquot et al. | 345/730 |
| 2005/0210331 | A1 * | 9/2005 | Connelly et al. | 714/26 |
| 2008/0287197 | A1 * | 11/2008 | Ruppert et al. | 463/42 |
| 2009/0024992 | A1 * | 1/2009 | Kulaga et al. | 717/177 |
| 2011/0047493 | A1 * | 2/2011 | Sung et al. | 715/765 |
| 2011/0047540 | A1 * | 2/2011 | Williams et al. | 717/178 |

* cited by examiner

*Primary Examiner* — Lewis A Bullock, Jr.
*Assistant Examiner* — Mark Gooray
(74) *Attorney, Agent, or Firm* — Sughrue Mion, PLLC

(57) ABSTRACT

A service performing method and a service requesting method are provided. The service performing method includes receiving from a second device a message including information representing whether to install a widget for performing a service, and location information of the widget; receiving the widget based on the location information of the widget, and selectively installing the widget based on the information representing whether to install the widget; and performing the service by executing the received widget.

15 Claims, 7 Drawing Sheets

MIGRATE WHOLE WIDGET

FIG. 2C

MIGRATE PART OF WIDGET

```
<messageOut name="installWidget">
    <output name="url" scriptParamType="string"/>
    <input name="returnCode" scriptParamType="number"/>
</messageOut>
```

FIG. 5B

```
<messageOut name="activateTemporaryWidget">
    <output name="url" scriptParamType="string"/>
    <input name="returnCode" scriptParamType="number"/>
</messageOut>
```

FIG. 5C

```
<messageOut name="migrateComponent">
    <output name="componentId" scriptParamType="string"/>
    <output name="targetCode" scriptParamType="string"/>
    <input name="returnCode" scriptParamType="number"/>
</messageOut>
```

FIG. 5D

```
<messageOut name="requestMigrationTargets">
    <input name="codes" scriptParamType="stringarray"/>
    <input name="names" scriptParamType="stringarray"/>
    <input name="descriptions" scriptParamType="stringarray"/>
</messageOut>
```

METHOD AND APPARATUS FOR PERFORMING SERVICE RELATED TO A PREDETERMINED DEVICE TO ANOTHER DEVICE BASED ON WIDGET MIGRATION

CROSS-REFERENCE TO RELATED APPLICATION

This application claims the benefit of U.S. Provisional Patent Application No. 61/391,168, filed on Oct. 8, 2010 in the U.S. Patent and Trademark Office, and priority from Korean Patent Application No. 10-2011-0036848, filed on Apr. 20, 2011 in the Korean Intellectual Property Office, the disclosures of which are incorporated by reference herein in their entirety.

BACKGROUND

1. Field

Methods, apparatuses, and computer readable mediums consistent with exemplary embodiments relate performing a service, and more particularly, to performing a service based on a widget.

2. Description of the Related Art

Due to accelerated convergence between devices, services of various scenarios based on the convergence are being developed. A service capable of maximizing a user experience based on convergence between a plurality of devices connected in a network increasingly attracts attention.

SUMMARY

Exemplary embodiments provide a method and apparatus for performing a service related to a predetermined device in another device.

Exemplary embodiments also provide a computer-readable recording medium having recorded thereon a computer program for executing the method.

According to an aspect of an exemplary embodiment, there is provided a method of performing a service related to a second device in a first device, the method including receiving from the second device a message including information representing whether to install a widget for performing the service, and location information of the widget; receiving the widget based on the location information of the widget, and selectively installing the widget based on the information representing whether to install the widget; and performing the service by executing the received widget.

The message may be a first message representing that the widget is a widget that is to be installed and including a uniform resource locator (URL) of the widget, or a second message representing that the widget is a temporary widget that is not to be installed and including the URL of the widget.

The widget may be only a part of the widget executed in the second device in order to perform the service.

The method may further include, if the received message is the first message, transmitting to the second device a response message representing whether the widget has been successfully received, installed, and executed.

The method may further include, if the received message is the second message, transmitting to the second device a response message representing whether the widget has been successfully received and executed.

The performing of the service may include receiving and reproducing content related to the service, which is stored in the second device.

According to another aspect of an exemplary embodiment, there is provided a method of requesting a first device to perform a service related to a second device, the method including transmitting to the first device a message including information representing whether to install a widget for performing the service, and location information of the widget; and receiving from the first device a response message representing that the widget has been successfully executed, wherein the first device receives the widget based on the location information of the widget, selectively installs the widget based on the information representing whether to install the widget, and executes the widget.

According to another aspect of an exemplary embodiment, there is provided an apparatus of a first device for performing a service related to a second device, the apparatus including a widget control unit that receives from the second device a message including information representing whether to install a widget for performing the service, and location information of the widget, receives the widget based on the location information of the widget, and selectively installs and executes the widget based on the information representing whether to install the widget; and a service performing unit that performs the service based on the executed widget.

According to another aspect of an exemplary embodiment, there is provided an apparatus of a second device for requesting a first device to perform a service related to the second device, the apparatus including a widget control unit that transmits to the first device a message including information representing whether to install a widget for performing the service, and location information of the widget, and receiving from the first device a response message representing that the widget has been successfully executed; and a service performing unit that transmits content related to the service, which is stored in the second device, based on the response message, wherein the first device receives the widget based on the location information of the widget, selectively installs the widget based on the information representing whether to install the widget, and executes the widget.

According to another aspect of an exemplary embodiment, there is provided a computer-readable recording medium having recorded thereon a computer program for executing the method.

According to another aspect of an exemplary embodiment, there is provided a television for maximizing a user experience by performing a service related to a mobile device, the television including a widget controller that receives from the mobile device a message including a flag indicating whether to install a widget for performing the service and a uniform resource locator (URL) of the widget; receives the widget using the URL, and installs and executes the widget if the flag indicates that the widget is to be installed, or executes the widget without installing the widget if the flag indicates that the widget is not to be installed; and a service performing unit that performs the service based on the executed widget.

BRIEF DESCRIPTION OF THE DRAWINGS

The above and other aspects will become more apparent by describing in detail exemplary embodiments thereof with reference to the attached drawings in which.

DETAILED DESCRIPTION

Hereinafter, the present inventive concept will be described in detail by explaining exemplary embodiments with reference to the attached drawings.

A service capable of maximizing a user experience is enabled by using convergence between devices. For example, a user who views on a mobile device a photo or a video captured by using a camera module of the mobile device may switch his or her viewing to a television (TV) connected to the mobile device in a home network. While viewing the photo or the video on a widget included in the mobile device, the user of the mobile device may switch his or her viewing to another widget executed on a large screen of the TV.

According to the related art, a mobile device may transmit only contents to a TV connected to the mobile device in a home network, and an application included in the TV may reproduce the contents received from the mobile device.

However, in order to maximize user experience and to increase user satisfaction, a service may be performed based on association between a plurality of devices, e.g., a mobile device and a TV. Also, a user interface that is consistent with a user interface displayed on the mobile device may be displayed on the TV. For example, while viewing content by executing a widget in the mobile device, when a user switches his or her viewing to the TV, if the user may control the viewing of the content by using the mobile device, or if a widget displayed on the TV is consistent with the widget displayed on the mobile device in terms of color and type, the user's experience may be maximized.

Thus, a method and apparatus is provided for sharing a widget for performing a service related to a second device between first and second devices, and for performing the service based on the shared widget. Hereinafter, the second device is a device (e.g., a mobile device) that already has the widget, and performs or requests the first device to perform the service related to the second device. Also, the first device is a device (e.g., a TV) that shares the widget with the second device and performs the service related to the second device in association with the second device.

Hereinafter, a widget is described as an example of a user interface shared by the first and second devices. However, it will be easily understood by one of ordinary skill in the art that information regarding the user interface shared by the first and second devices is not limited to information related to the widget and may include any information used to share and display a user interface between and on a plurality of devices. For example, the first and second devices may share information regarding an application in order to share and display a user interface, and may share information regarding a user interface template that is a regularized type of the user interface.

The term "unit" as used herein means at least one of a hardware component and a software component that is executed by a hardware component such as a processor.

Figure 1:
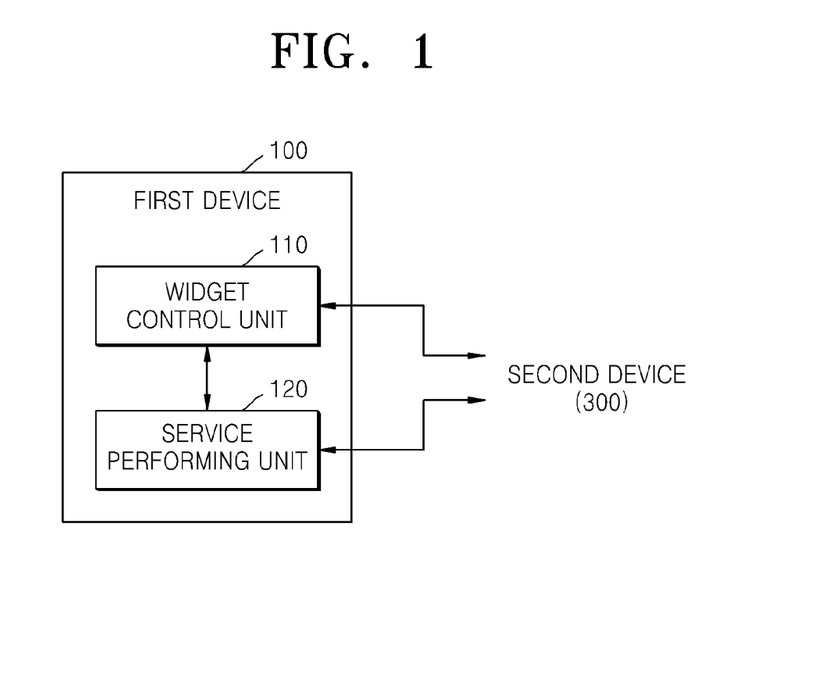
FIG. 1 is a block diagram of a service performing apparatus of a first device for performing a service related to a second device, according to an exemplary embodiment.

FIG. 1 is a block diagram of a service performing apparatus of a first device 100 for performing a service related to a second device 300, according to an exemplary embodiment.

Referring to FIG. 1, the service performing apparatus includes a widget control unit 110 and a service performing unit 120.

The widget control unit 110 receives information used to share a widget from the second device 300. The widget control unit 110 may receive a message related to the widget from the second device 300. A message related to a widget for performing the service related to the second device 300 is received. The service related to the second device 300 may be a service for reproducing a content of the second device 300, e.g., a service for displaying on the first device 100 a photo stored in the second device 300, a service for reproducing on the first device 100 a video stored in the second device 300, or a service for playing in the first device 100 music stored in the second device 300.

The message related to the widget, which is received from the second device 300 by the widget control unit 110, may include information representing whether to install the widget and location information of the widget.

The widget for performing the service related to the second device 300 may be selectively installed. In some cases, the widget may be forcibly installed. If the widget is to be forcibly installed, the first device 100 allocates a storage space for installing the widget, and manages the widget after the widget is installed. However, in other cases, the service related to the second device 300 may be temporary and not repeatedly performed after the widget is installed. In the case of a temporary service, the installation of the widget causes a waste of the storage space, and also causes inefficiency in continuously managing the widget that does not need to be managed.

Accordingly, in order to selectively install the widget, the message related to the widget, which is transmitted from the second device 300 to the widget control unit 110, includes information representing whether to install the widget. The second device 300 for requesting to perform the service previously determines whether to install the widget, and includes information regarding the determination in the message to be transmitted to the widget control unit 110.

Also, the message received from the second device 300 by the widget control unit 110 may include location information of the widget. The first device 100 receives the widget to perform the service related to the second device 300. Also, as described above, in order to allow the first and second devices 100 and 300 to share the widget to maximize the user experience, it is advantageous to have consistency between a widget executed in the second device 300 to perform the service in the second device 300 and a widget executed in the first device 100 to perform the service in the first device 100.

Accordingly, in order to allow the first device 100 to consistently receive and execute the widget, the message received from the second device 300 to the widget control unit 110 may include the location information of the widget. For example, uniform resource locator (URL) information of a location where widget data is receivable may be included in the message.

The widget control unit 110 may receive different messages according to whether the widget is installed. As will be described below with reference to FIGS. 5A through 5D, the widget control unit 110 may receive from the second device 300 messages having different names according to whether the widget is installed.

The widget control unit 110 may receive from the second device 300 a first message representing that the widget for performing the service related to the second device 300 is a widget that is to be installed in the first device 100, or a second message representing that the widget is a temporary widget that is executed temporarily without being installed in the first device 100. The first and second messages include the above-described location information of the widget regardless of whether the widget is to be installed or not.

The message related to the widget, which is received from the second device 300 by the widget control unit 110, may include information regarding a part of the widget instead of the whole widget. The first and second devices 100 and 300 may separately perform different parts of the whole widget. In this case, the message related to the widget, which is received from the second device 300 to the widget control unit 110, may include information regarding a part of the widget. Migration of the whole or a part of the widget is described as follows with reference to FIGS. 2A through 2C.

Figure 2A:
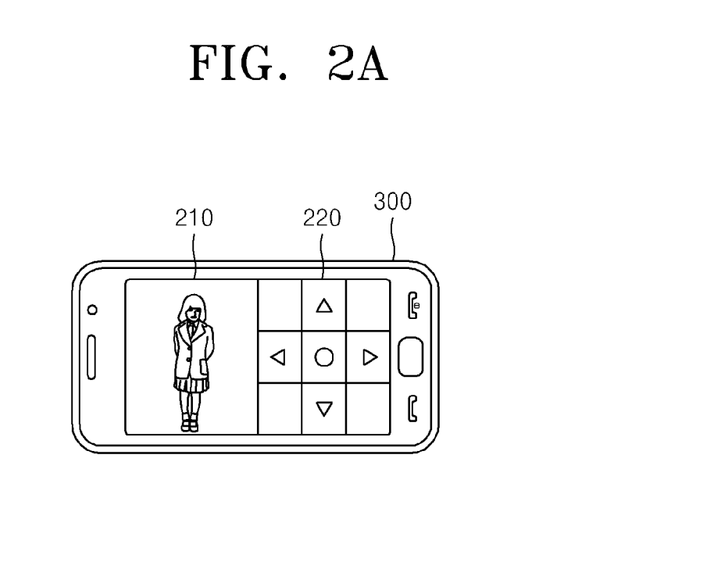
FIGS. 2A through 2C are images for showing a service based on widget migration, according to an exemplary embodiment.
Figure 2B:
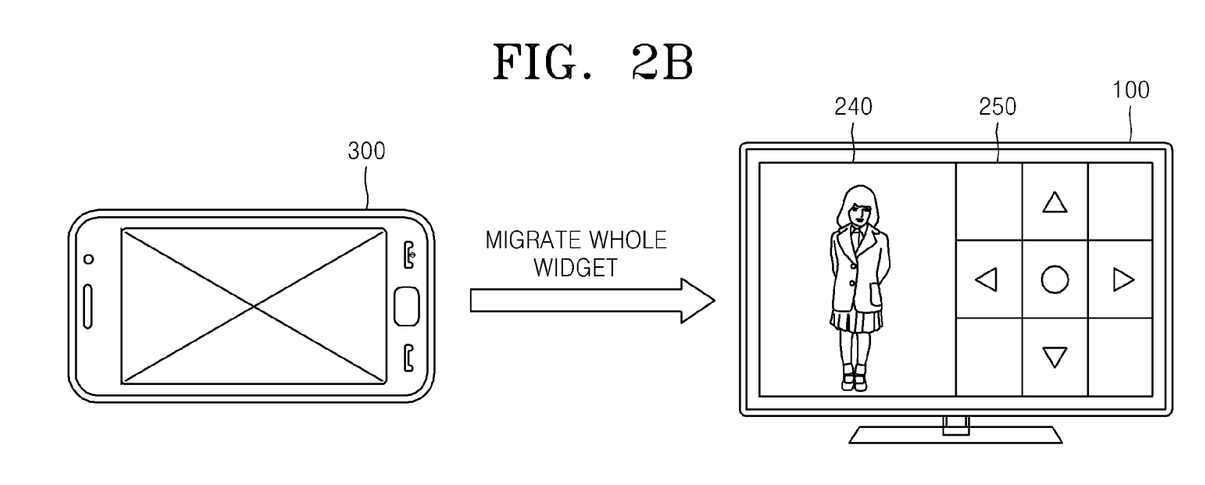
Figure 2C:
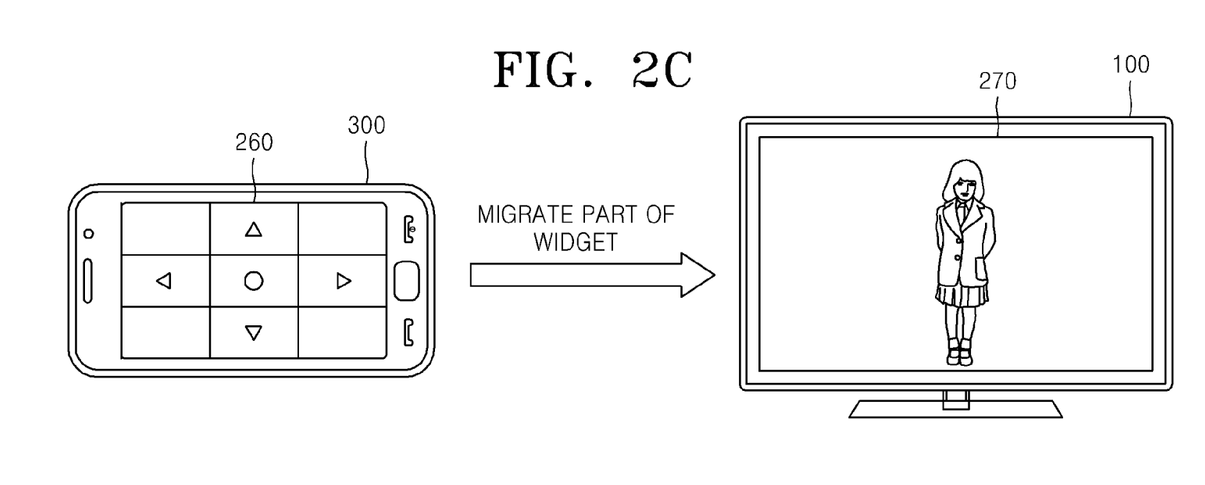

FIGS. 2A through 2C are images for showing a service based on widget migration, according to an exemplary embodiment.

As illustrated in FIG. 2A, if the service related to the second device 300 is performed only in the second device 300, the whole widget is displayed on a screen of the second device 300. The widget may include a content reproduction part 210 and a reproduction control part 220.

However, according to an exemplary embodiment, since the first device 100 also performs the service related to the second device 300, as illustrated in FIG. 2B, the widget is not displayed on the screen of the second device 300 and the whole widget is displayed on a screen of the first device 100. Both of a content reproduction part 240 and a reproduction control part 250 included in the widget may be displayed on the screen of the first device 100. Alternately, the widget may be displayed on both the screen of the second device 300 and the screen of the first device 100.

Also, instead of the whole widget being executed only in the first device 100; as illustrated in FIG. 2C, only a part of the widget, e.g., a content reproduction part 270, may be executed in the first device 100, and a remaining part of the widget, e.g., a reproduction control part 260, may be executed in the second device 300. Thus, the content reproduction part 270 may be displayed on the screen of the first device 100, and the reproduction control part 260 may be executed in the second device 300. In this exemplary embodiment, the widget is shown with two parts. However, in some cases, the widget may have more than two parts, and in such cases, the number of parts may be split between the first device 100 and the second device 300 according to the functionality provided by the widget. That is, the number of parts displayed on the first device 100 or the second device 300 is not particular limited, and the number may be allocated depending on the widget or the functionality to be deployed.

Referring to FIG. 1, in the case in which only a part of the widget is executed in the first device 100 as illustrated in FIG. 2C, the widget control unit 110 does not receive information regarding the whole widget, and receives only information regarding the part of the widget, from the second device 300. A message including information representing whether to install the part of the widget and location information of the part of the widget may be received from the second device 300.

After the message related to the widget is received from the second device 300, the widget control unit 110 receives the widget based on the location information of the widget included in the message related to the widget. The widget data is requested based on the URL information included in the message, and is received in response to the request.

After the widget data is received, the widget control unit 110 selectively installs the widget based on the information representing whether to install the widget. Whether to install the widget is determined based on the information representing whether to install the widget included in the message received from the second device 300, and the widget is selectively installed based on the determination result.

Also, according to another exemplary embodiment, the widget control unit 110 may receive the widget data itself from the second device 300. Instead of the message including the location information of the widget, the widget data may be received from the second device 300. At least one file for executing the widget may be received from the second device 300. If the widget is to be installed in the first device 100, at least one file for installing the widget may be received from the second device 300. On the other hand, if the widget is to be executed without being installed in the first device 100, at least one file for directly executing the widget without installing the widget may be received from the second device 300. If the widget data that requires installation is received, the widget is installed by executing a file for installing the widget.

Once the widget is completely received, or received and installed, the widget control unit 110 executes the widget. A whole or a part of the widget related to the service may be executed. If the widget is executed, a user interface related to the service may be displayed on the screen of the first device 100 as illustrated in FIG. 2B or 2C.

The service performing unit 120 performs the service related to the second device 300 based on the widget executed by the widget control unit 110. The service is performed in association with the second device 300 based on the executed widget. A content related to the service may be received and reproduced from the second device 300.

If the widget is completely received and executed, the widget control unit 110 may transmit to the second device 300 a response message representing that the widget is completely received and executed. On the other hand, if the widget is installed, the widget control unit 110 may transmit to the second device 300 a response message representing that the widget is completely received and installed. A response message to the above-described first or second message received from the second device 300 may be transmitted to the second device 300.

Figure 3:
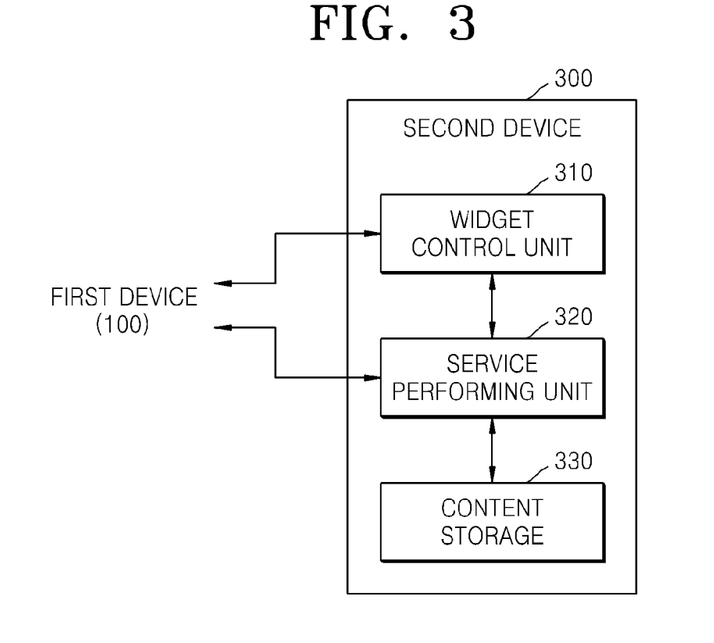
FIG. 3 is a block diagram of a service requesting apparatus of a second device for requesting a first device to perform a service related to the second device, according to an exemplary embodiment.

FIG. 3 is a block diagram of a service requesting apparatus of the second device 300 for requesting the first device 100 to perform a service related to the second device 300, according to an exemplary embodiment.

Referring to FIG. 3, the service requesting apparatus includes a widget control unit 310, a service performing unit 320, and a content storage 330.

The widget control unit 310 transmits information to share a widget to the first device 100. The widget control unit 110 may transmit a message related to the widget to the first device 100. A message related to a widget for performing the service related to the second device 300 may be transmitted. The message related to the widget may include information representing whether to install the widget and location information of the widget. URL information of a location where widget data is receivable may be included in the message. The widget control unit 310 may transmit to the first device 100 a first message representing that the widget for performing the service is a widget that is to be installed in the first device 100, or a second message representing that the widget is a temporary widget that is to be executed temporarily without being installed in the first device 100.

Also, the widget control unit 310 may transmit the widget data to the first device 100. Instead of the message including the location information of the widget, the widget data may be transmitted to the first device 100. At least one file for executing the widget may be transmitted to the first device 100. If the widget is to be installed in the first device 100, at least one file for installing the widget may be transmitted to the first device 100.

If the second device 300 transmits to the first device 100 information regarding only a part of the widget related to the service, the widget control unit 310 may execute a remaining part of the widget other than the part of the widget executed in the first device 100.

Also, the widget control unit 310 may receive from the first device 100 a response message representing that the widget is completely received and executed. If the widget is installed in the first device 100, a response message representing that the widget is completely received, installed, and executed may be received form the first device 100. A response message to the above-described first or second message transmitted from the widget control unit 310 to the first device 100 may be received from the first device 100.

The service performing unit 320 performs the service related to the second device 300 in association with a whole or a part of the widget executed in the first device 100. If the whole widget is executed in the first device 100 as illustrated in FIG. 2B, a content related to the service is transmitted to the first device 100. A content to be reproduced in the first device 100 may be read from the content storage 330 and may be transmitted to the first device 100. On the other hand, if a part of the widget is executed in the first device 100 as illustrated in FIG. 2C, the service performing unit 320 performs the service by executing the remaining part of the widget related to the service. Even in this case, a content to be reproduced in the first device 100 may be read from the content storage 330 and may be transmitted to the first device 100. Also, if only a part of the content related to the service is reproduced in the first device 100, the service performing unit 320 may reproduce the remaining part of the content other than the part of the content reproduced in the first device 100.

Figure 4A:
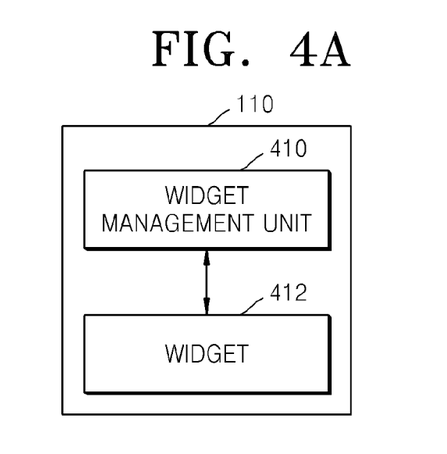
FIGS. 4A and 4B are block diagrams of widget control units of the first and second devices illustrated in FIGS. 1 and 3, according to an exemplary embodiment.
Figure 4B:
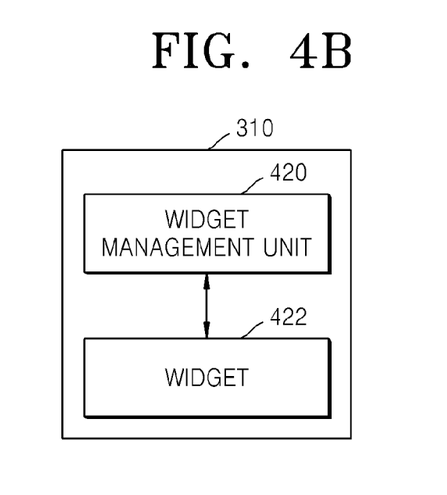

FIGS. 4A and 4B are block diagrams of the widget control units 110 and 310 of the first and second devices 100 and 300 illustrated in FIGS. 1 and 3, according to an exemplary embodiment.

Referring to FIGS. 4A and 4B, the widget control unit 110 of the first device 100 includes a widget management unit 410 and a widget 412, and the widget control unit 310 of the second device 300 includes widget management unit 420, and widget 422.

The widget management units 410 and 420 manage at least one of installation and execution of a widget. The widget management units 410 and 420 install a widget for performing a service related to the second device 300 in at least one of the first and second devices 100 and 300, or execute a widget in at least one of the first and second devices 100 and 300. The widget management units 410 and 420 may manage at least one of installation and execution of a widget by transmitting and receiving the widgets 412 and 422 and control information via an interface.

As described above in relation to FIGS. 1 and 3, since the service performing apparatus of the first device 100 and the service requesting apparatus of the second device 300 share a widget for performing the service related to the second device 300 by transmitting and receiving a message or widget data, the transmission and reception of the message or the widget data between the widget management units 410 and 420 and the widgets 412 and 422 will now be described in detail with reference to FIGS. 5A through 5D.

FIGS. 5A through 5D show messages transmitted and received between the widgets 412 and 422 and the widget management units 410 and 420 illustrated in FIGS. 4A and 4B in order to execute a service performing method, according to an exemplary embodiment.

The above-described service providing method and the service requesting method are related to a method of using a service related to the second device 300 in the first device 100 by executing the widget 412 while the service is used in the second device 300 by executing the widget 422. Accordingly, if a user selects a menu item on the widget 422 of the second device 300, the widget 422 may transmit the message illustrated in FIG. 5A or 5B to the widget management unit 410 of the first device 100 in order to perform the service related to the second device 300 in the first device 100.

Figure 5A:
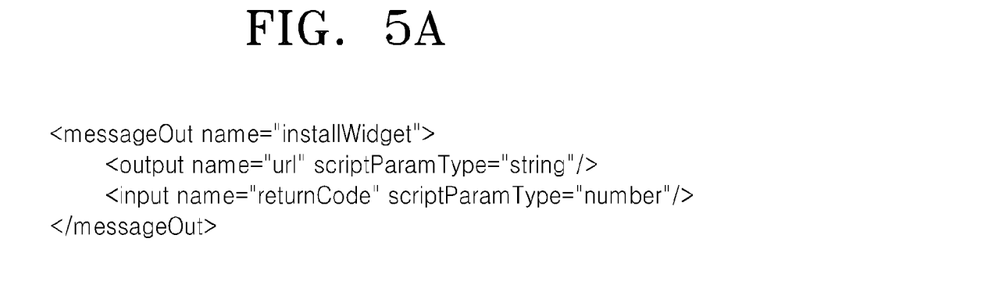
FIGS. 5A through 5D show messages transmitted and received between widgets and widget management units illustrated in FIGS. 4A and 4B in order to execute a service performing method, according to an exemplary embodiment.

FIG. 5A shows a first message representing a widget that is to be installed in the first device 100. The first message illustrated in FIG. 5A may be transmitted from the widget 422 of the second device 300 to the widget management unit 410 of the first device 100.

A name of the first message is defined as "installWidget", and location information of the widget that has to be installed in the first device 100 is defined as "url". A script type of the "url" is defined as "string". "ReturnCode" is a name of a response message transmitted from the widget management unit 410 of the first device 100 when the widget is completely received, installed, and executed, and a script type of the "returnCode" is defined as "number". The first device 100 may return "1" as the "returnCode" to the widget 422 of the second device 300 if the widget is successfully received, installed, and executed, and may return "0" as the "returnCode" to the widget 422 of the second device 300 if the widget fails to be received, installed, and executed.

Figure 5B:
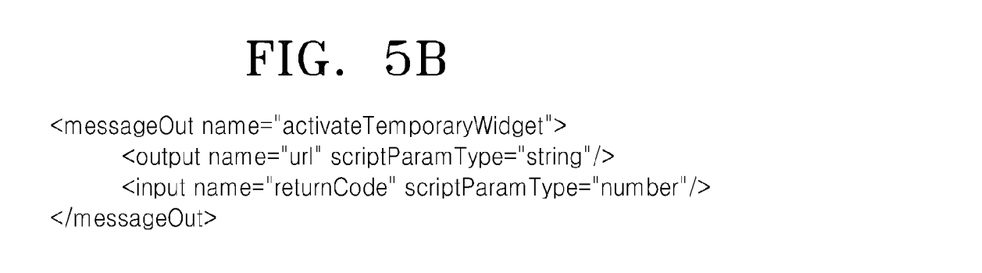

FIG. 5B shows a second message representing a temporary widget that is executed temporarily without being installed in the first device 100. The second message illustrated in FIG. 5B may also be transmitted from the widget 422 of the second device 300 to the widget management unit 410 of the first device 100.

A name of the second message is defined as "activateTemporaryWidget", and location information of the widget that is executed temporarily without being installed in the first device 100 is defined as "url". A script type of the "url" is defined as "string". "ReturnCode" is a name of a response message transmitted from the widget management unit 410 of the first device 100 when the widget is completely received and executed, and a script type of the "returnCode" is defined as "number". The first device 100 may return "1" as the "returnCode" to the widget 422 of the second device 300 if the widget is successfully received and executed, and may return "0" as the "returnCode" to the widget 422 of the second device 300 if the widget fails to be received and executed.

Figure 5C:
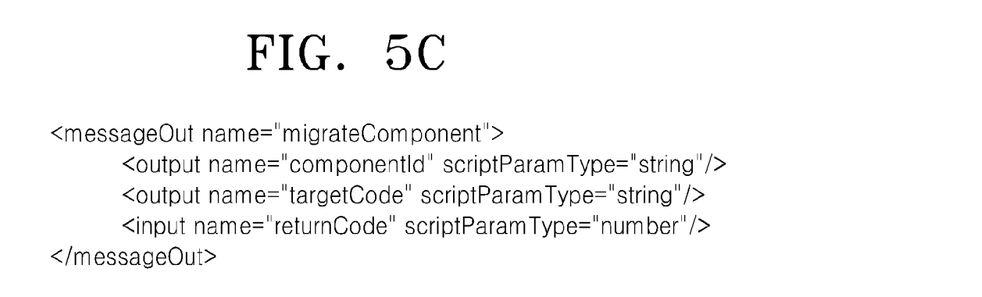
Figure 5D:
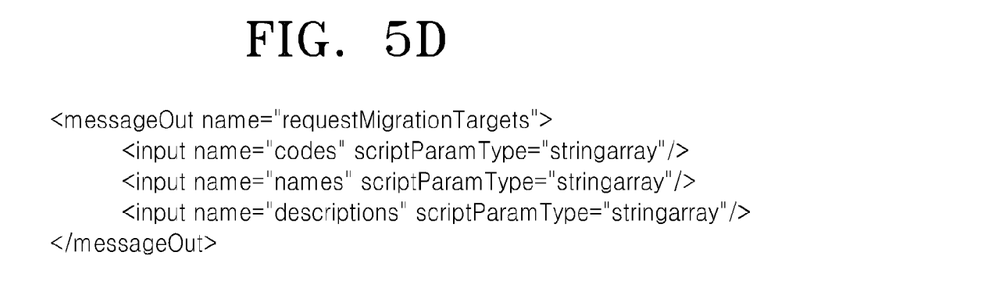

FIGS. 5C and 5D respectively show messages transmitted from the widget 422 to the widget management unit 420 in the second device 300 if a whole or a part of the widget is executed in the first device 100. As described above in relation to FIGS. 2B and 2C, the first device 100 may execute a whole or a part of the widget in order to perform the service related to the second device 300. In this case, the widget 422 and the widget management unit 420 of the second device 300 transmit and receive a message for migrating the widget to the first device 100.

FIG. 5C shows a message for requesting migration of the widget, which is transmitted from the widget 422 to the widget management unit 420 in the second device 300. Since the widget management unit 420 manages at least one of installation and execution of the widget, widget data for executing the widget is managed by the widget management unit 420. Accordingly, in order to migrate the whole or a part of the widget to the first device 100, the widget management unit 420 may be requested to migrate the widget.

Referring to FIG. 5C, a name of the message transmitted from the widget 422 to the widget management unit 420 in order to migrate the widget is defined as "migrateComponent". Information for specifying a part of the whole widget to be migrated to the first device 100 is defined as "componentId", and a script type of the "componentId" is defined as "string". If the whole widget is migrated to the first device 100, the "componentId" may be defined as a string array representing migration of the whole widget.

"TargetCode" denotes a migration destination of the widget. If the second device 300 and a plurality of devices are connected in a network, information for specifying the migration destination of the widget, i.e., the first device 100, (for example, an identifier of the first device 100) is defined as the "targetCode". "ReturnCode" is a name of a response message transmitted from the widget management unit 420 when the widget is completely migrated, and a script type of the "returnCode" is defined as "number". The widget management unit 420 may return "1" as the "returnCode" to the widget 422 of the second device 300 if the widget is successfully migrated, and may return "0" as the "returnCode" to the widget 422 of the second device 300 if the widget fails to be migrated. One of ordinary skill in the art will recognize that other indicators may also be used to indicate success or failure.

The widget management unit 420 that receives the message illustrated in FIG. 5C may transmit the message illustrated in FIG. 5A or 5B to the widget management unit 410 of the first device 100. Based on the location information of the widget, which is included in the message illustrated in FIG. 5A or 5B and received from the widget management unit 420 of the second device 300, the widget management unit 410 may receive, selectively install, and then execute the whole or a part of the widget.

Also, the widget management unit 420 that receives the message illustrated in FIG. 5C may directly transmit the widget data to the widget management unit 410 of the first device 100. Based on the message illustrated in FIG. 5C and received from the widget 422, the widget data of the whole or a part of the widget may be directly transmitted to the first device 100. The widget management unit 410 that receives the widget data may selectively install the widget data and then may execute the whole or a part of the widget.

FIG. 5D shows a message for searching for the migration destination of the widget. According to the message illustrated in FIG. 5C, in order to migrate the whole or a part of the widget to the first device 100, the migration destination is defined by the "targetCode". However, if the second device 300 does not have information for specifying the first device 100 (for example, an identifier of the first device 100), the migration destination is searched by the widget management unit 420. Accordingly, in order to request to search for the migration destination, the widget 422 of the second device 300 transmits the message illustrated in FIG. 5D to the widget management unit 420.

Referring to FIG. 5D, a name of the message transmitted from the widget 422 to the widget management unit 420 in order to search for the migration destination is defined as "requestMigrationTargets".

The widget management unit 420 that receives the "requestMigrationTargets" message searches for a device to which the widget is migratable from among the devices connected to the second device 300 in a network, and returns a search result to the widget 422.

The search result returned from the widget management unit 420 to the widget 422 is defined as "codes", "names", and "descriptions". At least one identifier corresponding to each of at least one searched device is denoted as the "codes". A script type of the "codes" is denoted as "stringarray". Also, a name of each of at least one searched device is denoted as the "names", and a script type of the "names" is also denoted as "stringarray". A detailed description of each of at least one searched device is denoted as the "descriptions", and a script type of the "description" is also denoted as "stringarray".

Figure 6:
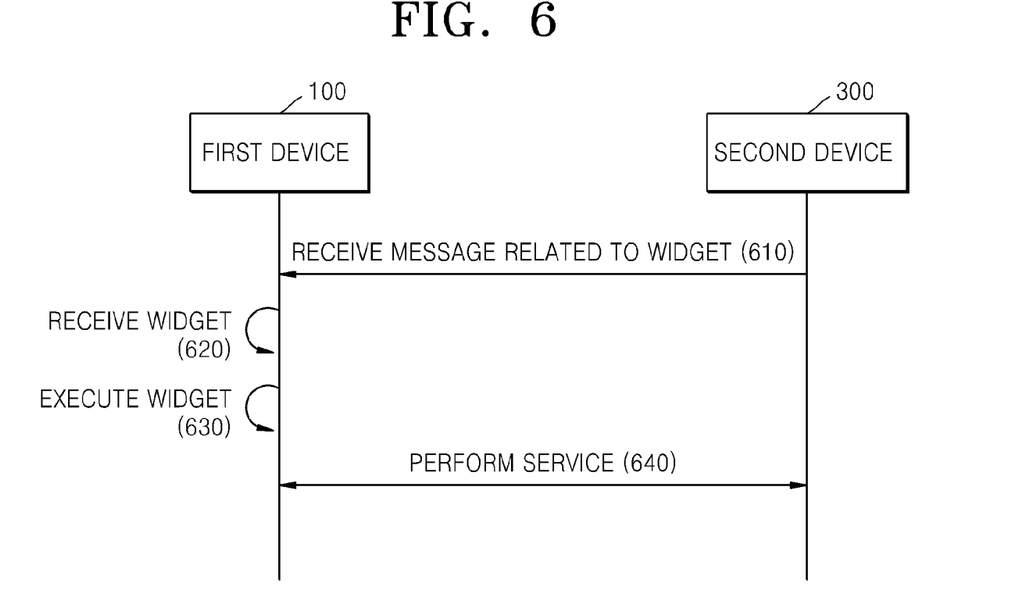
FIG. 6 is a flowchart of a service performing method according to an exemplary embodiment.

FIG. 6 is a flowchart of a service performing method according to an exemplary embodiment.

Referring to FIG. 6, in operation 610, the first device 100 receives a message related to a widget from the second device 300. A message related to a widget for performing a service related to the second device 300 is received. The received message may include information representing whether to install the widget and location information of the widget. The location information of the widget may be URL information of a location where widget data is receivable. On the other hand, a second message representing that the widget for performing the service related to the second device 300 is a temporary widget that is executed temporarily without being installed in the first device 100 is received.

In operation 620, the first device 100 receives the widget based on the location information of the widget, which is included in the message received in operation 610. Widget data is requested and received based on the URL information included in the message. The widget data may include at least one file for executing the widget.

In operation 630, the first device 100 executes the widget. The widget is executed based on the widget data received in operation 620. Since the message received in operation 610 is the second message representing that the widget does not have to be installed, the widget is executed without being installed. The executed widget may be the whole or a part of the widget for performing the service related to the second device 300.

In operation 640, the first device 100 performs the service related to the second device 300 based on the widget executed in operation 630. If only a part of the widget is executed in the first device 100, the service is performed in association with the remaining part of the widget executed in the second device 300. The first device 100 may receive and reproduce a content transmitted from the second device 300.

Figure 7:
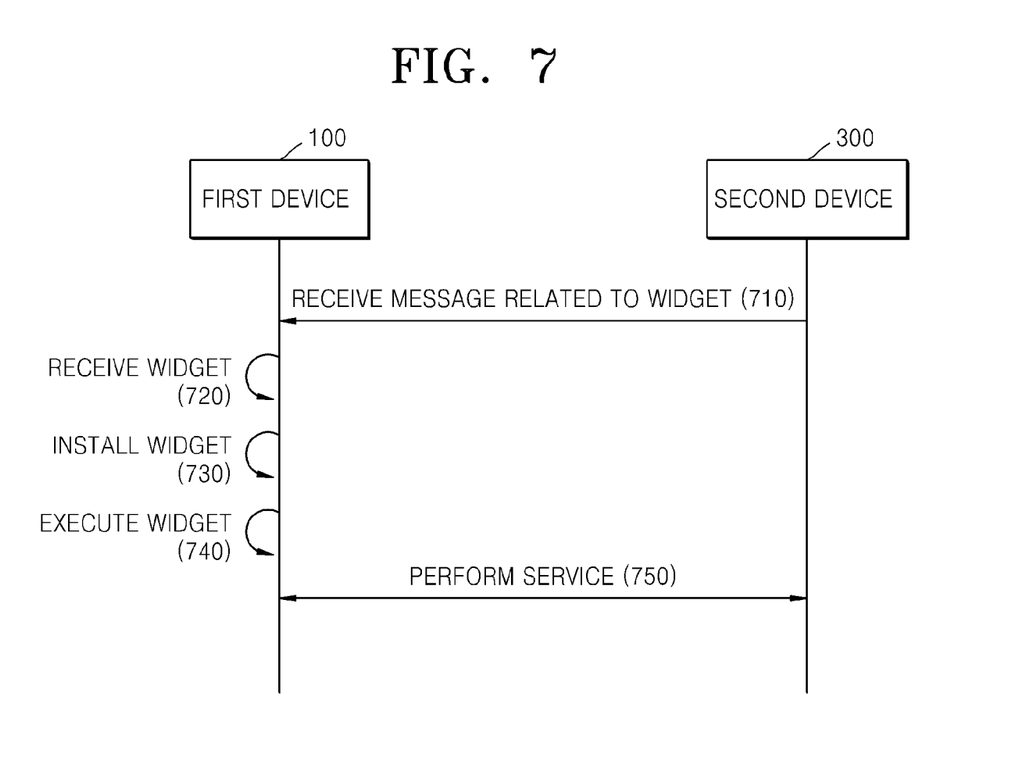
FIG. 7 is a flowchart of a service performing method according to another exemplary embodiment.

FIG. 7 is a flowchart of a service performing method according to another exemplary embodiment.

Referring to FIG. 7, in operation 710, the first device 100 receives a message related to a widget from the second device 300. A message related to a widget, which includes information representing whether to install the widget and location information of the widget, is received. Unlike the message received in operation 610, the message received in operation 710 is a first message representing that the widget for performing a service related to the second device 300 is a widget that is to be installed in the first device 100.

In operation 720, the first device 100 receives the widget based on the location information of the widget, which is included in the message received in operation 710. Widget data is requested and received based on the URL information included in the message. The widget data may include at least one file for executing the widget.

In operation 730, the first device 100 installs the widget. The widget is installed based on the widget data received in operation 720.

In operation 740, the first device 100 executes the widget. The widget installed in operation 730 is executed. The executed widget may be the whole or a part of the widget for performing the service related to the second device 300.

In operation 750, the first device 100 performs the service related to the second device 300 based on the widget executed in operation 740. If only a part of the widget is executed in the first device 100, the service is performed in association with the remaining part of the widget executed in the second device 300. The first device 100 may receive and reproduce a content transmitted from the second device 300.

Figure 8:
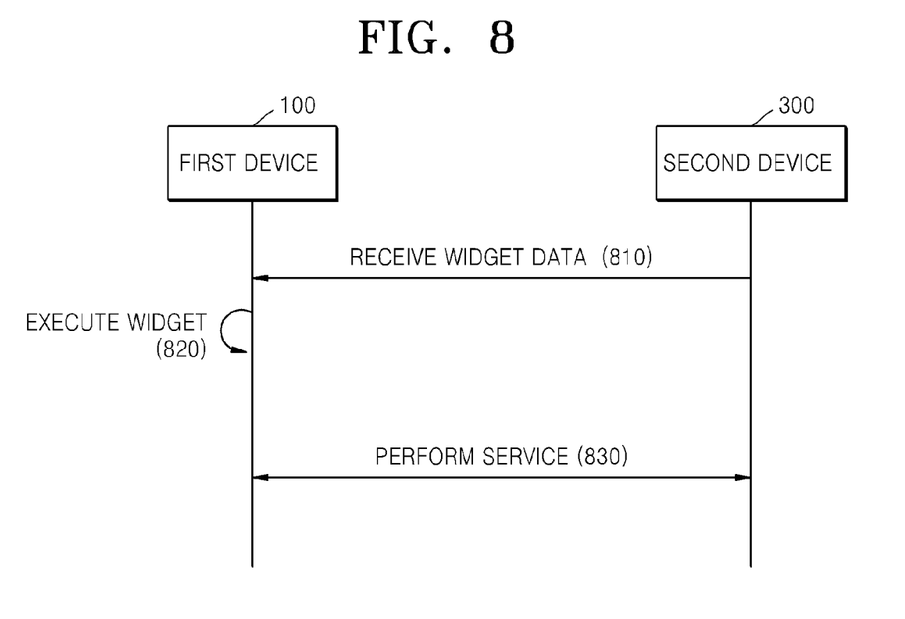
FIG. 8 is a flowchart of a service performing method according to another exemplary embodiment.

FIG. 8 is a flowchart of a service performing method according to another exemplary embodiment.

Referring to FIG. 8, in operation 810, the first device 100 receives widget data for performing a service related to the second device 300. As illustrated in FIGS. 2B and 2C, a whole or a part of a widget of the second device 300 may be migrated to the first device 100. Accordingly, in operation 810, the first device 100 receives a file(s) for at least one of installation and execution of the widget to be migrated to the first device 100.

In operation 820, the first device 100 executes the widget based on the widget data received in operation 810. If the widget is a widget that is to be installed in the first device 100 and the widget data received in operation 810 includes at least one file for installing the widget, in operation 820, the widget is installed and the installed widget is executed. On the other hand, if the widget is a temporary widget that is not to be installed in the first device 100 and the widget data received in operation 810 includes at least one file for executing the widget, in operation 820, the temporary widget is executed. The widget executed in operation 820 may be the whole widget as illustrated in FIG. 2B, or may be a part of the widget as illustrated in FIG. 2C.

In operation 830, the first device 100 performs the service related to the second device 300 based on the widget executed in operation 820. If only a part of the widget is executed in the first device 100, the service is performed in association with the remaining part of the widget executed in the second device 300. The first device 100 may receive and reproduce a content transmitted from the second device 300.

According to the present inventive concept, since a widget may be selectively installed even when a device performs a service related to another device, the complexity in managing widgets, which is caused by unconditional installation of the widgets, may be reduced, and services of various scenarios using temporary widgets that are executable without being installed are enabled.

Also, since a service may be performed by using a plurality of devices based on migration of one or more parts of a widget, the user experience may be maximized by providing the service based on an association between the devices.

The present inventive concept can also be embodied as computer-readable codes on a computer-readable recording medium. The computer-readable recording medium is any data storage device that can store data which can be thereafter read by a computer system.

For example, a service performing apparatus and a service requesting apparatus, according to an exemplary embodiment, may include a bus connected to every unit of the apparatuses illustrated in FIGS. 1 and 3, at least one processor connected to the bus, and memory connected to the bus so as to store commands, receive messages, or generate messages and connected to the processor for executing the commands.

Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

While exemplary embodiments been particularly shown and described, it will be understood by one of ordinary skill in the art that various changes in form and details may be made therein without departing from the spirit and scope of the present inventive concept as defined by the following claims and their equivalents.

What is claimed is:

1. A method of performing a service related to a second device in a first device, the method comprising:
   receiving from the second device a message comprising a flag indicating whether to install a widget for performing the service, information representing whether to execute the widget without being installed, and a uniform resource lector (URL) of the widget;
   receiving the widget based on the URL, and selectively installing the widget if the flag indicates that the widget is to be installed; and
   performing the service by executing the received widget,
   wherein the widget received by the first device is a part of a whole widget executed in the second device in order to perform the service.

2. The method of claim 1, wherein the message is a first message representing that the widget is a widget that is to be installed and comprising the URL of the widget, or a second message representing that the widget is a temporary widget that is not to be installed and comprising the URL of the widget.

3. The method of claim 2, further comprising, if the received message is the first message, transmitting to the second device a response message representing whether the widget has been successfully received, installed, and executed.

4. The method of claim 2, further comprising, if the received message is the second message, transmitting to the second device a response message representing whether the widget has been successfully received and executed.

5. The method of claim 1, wherein the performing of the service comprises receiving and reproducing content related to the service, which is stored in the second device.

6. A method of requesting a first device to perform a service related to a second device, the method comprising:
   transmitting to the first device a message comprising a flag indicating whether to install a widget for performing the service, information representing whether to execute the widget without being installed, and a uniform resource locator (URL) of the widget; and
   receiving from the first device a response message representing that the widget has been successfully executed,
   wherein the first device receives the widget based on the URL of the widget, selectively installs the widget and executes the widget if the flag indicates that the widget is to be installed,
   wherein the widget received by the first device is apart of a whole widget executed in the second device in order to perform the service.

7. The method of claim 6, wherein the message is a first message representing that the widget is a widget that is to be installed and comprising the URL of the widget, or a second message representing that the widget is a temporary widget that is not to be installed and comprising the URL of the widget.

8. The method of claim 6, further comprising transmitting content related to the service, which is stored in the second device, based on the response message.

9. An apparatus of a first device for performing a service related to a second device, the apparatus comprising:
a widget control unit that receives from the second device a message comprising a flag indicating whether to install a widget for performing the service, information representing whether to execute the widget without being installed, and a uniform resource locator (URL) of the widget, receives the widget based on the URL of the widget, and selectively installs and executes the widget if the flag indicates that the widget is to be installed; and
a service performing unit that performs the service based on the executed widget,
wherein at least one of the widget control unit and the service performing unit is implemented as a hardware component,
wherein the widget received by the first device is a part of a whole widget executed in the second device in order to perform the service.

10. An apparatus of a second device for requesting a first device to perform a service related to the second device, the apparatus comprising:
a widget control unit that transmits to the first device a message comprising a flag indicating whether to install a widget for performing the service, information representing whether to execute the widget without being installed, and a uniform resource locator (URL) of the widget, and receives from the first device a response message representing that the widget has been successfully executed; and
a service performing unit that transmits content related to the service, which is stored in the second device, based on the response message,
wherein the first device receives the widget based on the URL of the widget, selectively installs the widget and executes the widget if the flag indicates that the widget is to be installed,
wherein at least one of the widget control unit and the service performing unit is implemented as a hardware component,
wherein the widget received by the first device is a part of a whole widget executed in the second device in order to perform the service.

11. A non-transitory computer-readable recording medium having recorded thereon a computer program for executing a method comprising:
receiving from the second device a message comprising a flag indicating whether to install a widget for performing the service information representing whether to execute the widget without being installed, and a uniform resource locator (URL) of the widget;
receiving the widget based on the URL of the widget, and selectively installing the widget if the flag indicates that the widget is to be installed; and
performing the service by executing the received widget,
wherein the widget received by the first device is a part of a whole widget executed in the second device in order to perform the service.

12. A non-transitory computer-readable recording medium having recorded thereon a computer program for executing a method comprising:
transmitting to the first device a message comprising a flag indicating whether to install a widget for performing the service, information representing whether to execute the widget without being installed, and a uniform resource locator (URL) of the widget; and
receiving from the first device a response message representing that the widget has been successfully executed,
wherein the first device receives the widget based on the URL of the widget, selectively installs the widget and executes the widget if the flag indicates that the widget is to be installed,
wherein the widget received by the first device is a part of a whole widget executed in the second device in order to perform the service.

13. A television for maximizing a user experience by performing a service related to a mobile device, the television comprising:
a widget controller that:
receives from the mobile device a message comprising a flag indicating whether to install a widget for performing the service, information representing whether to execute the widget without being installed, and a uniform resource locator (URL) of the widget;
receives the widget using the URL, and installs and executes the widget if the flag indicates that the widget is to be installed, or executes the widget without installing the widget if the flag indicates that the widget is not to be installed; and
a service performing unit that performs the service based on the executed widget,
wherein at least one of the widget controller and the service performing unit is implemented as a hardware component, and
wherein the widget received by the first device is a part of a whole widget is being executed on the mobile device.

14. The television according to claim 13, wherein the executed widget controls the television to process content stored on the mobile device.

15. The television according to claim 13, wherein the television sends a response message to the mobile device indicating an installation and execution status of the widget.

* * * * *